(12) United States Patent
Moore

(10) Patent No.: US 11,273,669 B2
(45) Date of Patent: Mar. 15, 2022

(54) OMNI-TRACK SYSTEMS FOR WHEELS

(71) Applicant: Toyota Motor North America, Inc., Plano, TX (US)

(72) Inventor: Douglas A. Moore, Fairview, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 260 days.

(21) Appl. No.: 16/667,421

(22) Filed: Oct. 29, 2019

(65) Prior Publication Data
US 2020/0391543 A1   Dec. 17, 2020

Related U.S. Application Data

(60) Provisional application No. 62/860,495, filed on Jun. 12, 2019.

(51) Int. Cl.
| | |
|---|---|
| *B60B 19/00* | (2006.01) |
| *B60B 19/12* | (2006.01) |
| *B60T 1/04* | (2006.01) |
| *F16D 49/00* | (2006.01) |
| *F16D 65/16* | (2006.01) |
| *F16D 49/16* | (2006.01) |
| *F16D 49/14* | (2006.01) |
| *B60B 27/00* | (2006.01) |
| *F16D 121/14* | (2012.01) |
| *F16D 125/60* | (2012.01) |
| *F16D 125/68* | (2012.01) |
| *F16D 121/08* | (2012.01) |

(52) U.S. Cl.
CPC ............ *B60B 19/003* (2013.01); *B60B 19/12* (2013.01); *B60T 1/04* (2013.01); *F16D 49/00* (2013.01); *F16D 49/14* (2013.01); *F16D 49/16* (2013.01); *F16D 65/16* (2013.01); *B60B 27/0047* (2013.01); *B60B 2900/351* (2013.01); *F16D 2121/08* (2013.01); *F16D 2121/14* (2013.01); *F16D 2125/60* (2013.01); *F16D 2125/68* (2013.01)

(58) Field of Classification Search
CPC .......... B60B 19/003; B60B 19/12; B60T 1/04
See application file for complete search history.

(56) References Cited

U.S. PATENT DOCUMENTS

| | | | |
|---|---|---|---|
| 7,980,282 B2 | 7/2011 | Moyna et al. | |
| 7,980,336 B2 | 7/2011 | Takenaka et al. | |
| 10,518,756 B1* | 12/2019 | Liang | ...................... F16D 65/18 |

(Continued)

FOREIGN PATENT DOCUMENTS

| | | | | |
|---|---|---|---|---|
| CN | 106427388 A | | 2/2017 | |
| CN | 209008717 U | * | 6/2019 | ........... B60B 19/003 |

(Continued)

*Primary Examiner* — Jason R Bellinger
(74) *Attorney, Agent, or Firm* — Dinsmore & Shohl LLP

(57) ABSTRACT

An omni-track system for mounting onto a wheel may include a plurality of track segments. Each of the plurality of track segments may include a male connector, a female connector, a roller mount, and at least one roller. The female connector may be arranged opposite the male connector. The roller mount may be fixedly secured to the track segment. The at least one roller may be rotatably secured to the roller mount. The plurality of track segments may be linked together to fully encompass an outer circumference of the wheel.

20 Claims, 4 Drawing Sheets

(56) References Cited

U.S. PATENT DOCUMENTS

| | | | |
|---|---|---|---|
| 2016/0362134 A1* | 12/2016 | Carrasco | B62D 55/26 |
| 2016/0375723 A1* | 12/2016 | Jochim | B60B 19/02 |
| | | | 280/30 |
| 2016/0375814 A1* | 12/2016 | Jochim | B66B 9/16 |
| | | | 414/547 |
| 2017/0210407 A1 | 7/2017 | Warwick et al. | |
| 2020/0062031 A1* | 2/2020 | Murai | B60B 19/003 |
| 2020/0147998 A1* | 5/2020 | Choi | B60B 19/12 |

FOREIGN PATENT DOCUMENTS

| | | | | |
|---|---|---|---|---|
| DE | 102012221362 A1 | 5/2013 | | |
| WO | 2010052890 A1 | 5/2010 | | |
| WO | WO-2013021829 A1 * | 2/2013 | | B62D 55/26 |
| WO | WO-2015016493 A1 * | 2/2015 | | B60B 37/12 |
| WO | 2018024909 A1 | 2/2018 | | |

* cited by examiner

OMNI-TRACK SYSTEMS FOR WHEELS

CROSS-REFERENCE TO RELATED APPLICATIONS

This application claims the benefit of U.S. Provisional Application No. 62/860,495, filed Jun. 12, 2019, the entire contents of which is incorporated by reference in its entirety.

TECHNICAL FIELD

The present specification generally relates to omni-track systems for wheels and, more specifically, to omni-track systems arranged on a wheel assembly to convert a wheel into an omni-wheel.

BACKGROUND

Omni-wheels are wheels with rollers around the circumference that are perpendicular to the circumferential direction. This allows an omni-wheel to operate as a traditional wheel, which would be rolled in the circumferential direction of the wheel. Additionally, an omni-wheel cannot only roll in the circumferential direction, but can also be rolled along its rollers touching the ground perpendicular to the circumferential direction. This allows for an increase in maneuverability when compared to traditional wheels. However, current omni-wheels include specialized components when compared to a traditional wheel, such as a hub which can hold each roller along the circumference of the omni-wheel. Additionally, if a user would like to use an omni-wheel on a wheeled vehicle instead of a traditional wheel, the traditional wheel would need to be removed and an appropriately sized omni-wheel must be used it its place.

Accordingly, there is a need for omni-wheel systems that allow for the maneuverability of an omni-wheel without having to replace a wheel of a vehicle.

SUMMARY

According to a first aspect, an omni-track system for mounting onto a wheel may include a plurality of track segments. Each of the plurality of track segments may include a male connector, a female connector, a roller mount, and at least one roller. The female connector may be arranged opposite the male connector. The roller mount may be fixedly secured to the track segment. The at least one roller may be rotatably secured to the roller mount. The plurality of track segments may be linked together to fully encompass an outer circumference of the wheel.

Another aspect includes an omni-track system according to any of the previous aspects, a roller mount may be extending radially outward from the wheel.

Another aspect includes an omni-track system according to any of the previous aspects, a first roller and a second roller may be secured to the roller mount and radially offset from the wheel.

Another aspect includes an omni-track system according to any of the previous aspects, each of the plurality of track segments may be secured to the wheel by a set screw.

Another aspect includes an omni-track system according to any of the previous aspects, further including a tensioning device arranged between the plurality of track segments and the wheel to provide a radially outward force to the plurality of track segments.

Another aspect includes an omni-track system according to any of the previous aspects, the tensioning device may be a plurality of springs arranged between of the plurality of track segments and the wheel.

Another aspect includes an omni-track system according to any of the previous aspects, the tensioning device may be an inflatable bladder arranged between of the plurality of track segments and the wheel.

Another aspect includes an omni-track system according to any of the previous aspects, further comprising a braking system to brake the at least one roller of each plurality of track segments.

Another aspect includes an omni-track system according to any of the previous aspects, the braking system may disengage the at least one roller while the at least one roller contacts ground, and the braking system may reengage the at least one roller while the at least one roller is not in contact with the ground.

Another aspect includes an omni-track system according to any of the previous aspects, the plurality of track segments may be arranged within a channel formed on the outer circumference of the wheel.

Another aspect includes an omni-track system according to any of the previous aspects, the plurality of track segments may be linked together via a plurality of pins.

Another aspect includes an omni-track system according to any of the previous aspects, each of the plurality of pins may pass through a male connector of a first track segment and a female connector of a second track segment.

According to a second aspect, an omni-wheel track segment may include a male connector, a female connector, a roller mount, a first roller, a second roller, a braking system, and a mounting device. The female connector may be arranged opposite the male connector. The roller mount may be fixedly secured to the base plate and may extend radially outward from the track segment. The first roller may be rotatably secured to the roller mount. The second roller may be rotatably secured to the roller mount, opposite the first roller. The braking system may be arranged to prevent rotation of the first roller and the second roller. The mounting device may be arranged opposite the roller mount.

Another aspect includes an omni-track system according to any of the previous aspects, a plurality of track segments may be linked together to fully encompass an outer circumference of a wheel.

Another aspect includes an omni-track system according to any of the previous aspects, the plurality of track segments may be linked together via a plurality of pins.

Another aspect includes an omni-track system according to any of the previous aspects, each of the plurality of pins may pass through a male connector of a first track segment and a female connector of a second track segment.

Another aspect includes an omni-track system according to any of the previous aspects, the mounting device may be a set screw which secures the track segment to the outer circumference of a wheel.

Another aspect includes an omni-track system according to any of the previous aspects, a tensioning device may be arranged between the track segment and the wheel to provide a radially outward force to the track segment.

Another aspect includes an omni-track system according to any of the previous aspects, the tensioning device may be a spring arranged between of the track segment and the wheel.

Another aspect includes an omni-track system according to any of the previous aspects, the tensioning device may be an inflatable bladder arranged between of the track segment and the wheel.

Another aspect includes an omni-track system according to any of the previous aspects, the braking system may disengage the first roller and the second roller when the first roller and the second roller contact the ground.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present omni-track system may be a conversion kit used to convert any conventional wheel into an omni-wheel, giving the conventional wheel the ability to move in both the longitudinal and lateral directions, simultaneously or separately. A conventional wheel may include a hub, rim, and/or tire, with the tire only having the freedom to rotate the longitudinal direction in order to advance the wheel. The omni-track system provides the ability for the wheel to move in a second degree of freedom in the lateral direction. The omni-track system may require little to no alterations in order to secure the omni-track system to the conventional wheel, using the structure of the wheel as is, such as the channel formed in a rim. The omni-track system may include a braking system which allows a user to decide between strictly longitudinal rotation, or to have the ability to move in the lateral direction. The braking system may be in a braked passive state in order to prevent unwanted lateral rotation. Additionally, the omni-track system may be removed from the conventional wheel at any time when desired to convert the conventional wheel back into its original form. Also, the same omni-track system may be used with a variety of different sized wheels by adding or removing individual track segments which make up the omni-track system to change the diameter of the omni-track system. Since the omni-track system is made up of individual track segments, broken or damaged track segments may be removed and replaced in order to keep the omni-track system functioning properly.

Figure 1:
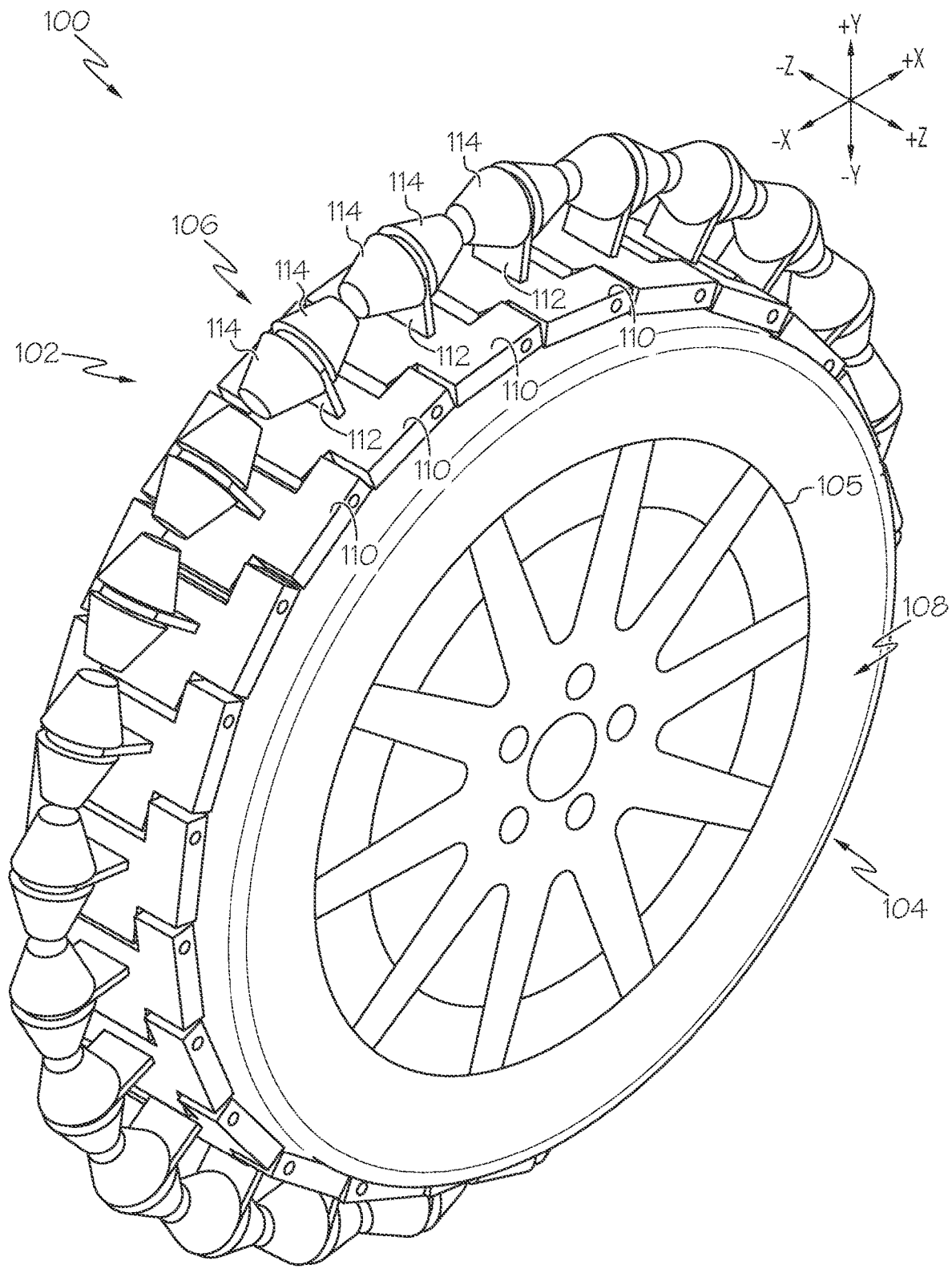
FIG. 1 schematically depicts an omni-track system arranged about a wheel, according to one or more embodiments shown or described herein.

FIG. 1 generally depicts an embodiment of an omni-track system for a wheel. The system may include a plurality of track segments. Each of the plurality of track segments may include a male connector, a female connector, a roller mount, and at least one roller. The female connector may be arranged opposite the male connector. The roller mount may be fixedly secured to the track segment. The at least one roller may be rotatably secured to the roller mount. The plurality of track segments may be linked together to fully encompass an outer circumference of the wheel, giving a traditional wheel the functionality and manoeuvrability of an omni-wheel without having to remove the wheel from a vehicle. Additionally, tensioning devices may be arranged within the wheel to keep the track segments tensioned around the wheel, and a braking system may be included in order to control the rotation of the rollers. Various embodiments of the omni-track system will be described in greater detail herein.

As used herein, the term "vehicle longitudinal direction" refers to the forward-rearward direction of the vehicle (i.e., in the +/−vehicle X-direction of the depicted coordinate axes). The term "vehicle lateral direction" refers to the cross-vehicle direction of the vehicle (i.e., in the +/−vehicle Z-direction of the depicted coordinate axes), and is transverse to the vehicle longitudinal direction. The term "vehicle vertical direction" refers to the upward-downward direction of the vehicle (i.e., in the +/−vehicle Y-direction of the depicted coordinate axes). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about a vehicle centerline, the direction to which use of terms "inboard" or "outboard" and refer may be mirrored about the vehicle centerline when evaluating components positioned along opposite sides.

Referring now to FIG. 1, an example omni-track system 100 is generally depicted. As illustrated, the omni-track system 100 may include an omni-track assembly 102 and a wheel assembly 104. As will be described in greater detail herein, the omni-track system 100 is configured to allow a conventional wheel to be converted to an omni-wheel to allow movement in both the longitudinal and lateral directions. The omni-track system 100 may be a conversion kit used to convert any conventional wheel into an omni-wheel. A conventional wheel may include a hub, rim, and/or tire, and may require little to no alterations in order to secure the omni-track system 100 to the conventional wheel. Additionally, the omni-track system 100 may be removed from a conventional wheel at any time when desired to convert the conventional wheel back into its original form. It is noted that the present omni-track system 100 may be used to move any type of vehicle wheel and vehicle, including terrestrial, aquatic, and/or airborne vehicles. It is noted that the wheel assembly 104 may include a rim 105 and a tire 108. However, it is contemplated that the present omni-track system 100 may be used to move wheeled objects not including a tire 108.

Referring still to FIG. 1, the omni-track assembly 102 may include a plurality of track segment assemblies 106. Each track segment assembly 106 may include a track segment 110 and a roller mount 112 secured to the track segment 110. The track segments 110 and the roller mounts 112 may be integral with one another, or the roller mount 112 may be secured to the track segment 110 separately. The roller mount 112 may extend radially outward from the center of the wheel assembly 104 in the X-Y plane and the may be arranged perpendicular to the surface of the tire 108. The track segments 110 and roller mounts 112 may be made from metal or another suitable material.

Each track segment 110 may include a roller 114 rotatably mounted to the roller mount 112. The rollers 114 may be radially offset from the wheel assembly 104 as to prevent the tire 108 of the wheel assembly 104 from contacting the ground. In an embodiment, the track segments 110 may each include a first and second roller 114, each rotatably arranged on the roller mount 112 and positioned on either side of the roller mount 112. The arrangement of rollers 114 may aid in a smooth transition from track segment 110 to track segment 110 as the omni-track system 100 rotates in the longitudinal direction (the +/−X-axis). The rollers 114 of each track segment 110 are arranged adjacent to one another, with a small gap forming between the rollers 114 of adjacent track segments 110. The rollers 114 or each track segment 110 may be individually rotatable, or rollers 114 of the same track segment 110 may be non-rotatably coupled to one another.

In an embodiment, the rollers 114 may be rubber or another suitable material. Additionally, the rollers 114 may further include treads arranged on the outer surfaces of the rollers 114 to aid in traction as the omni-track system 100 is operated. In an embodiment, the rollers 114 may have alternating sizes, such as large and small, to allow the smaller rollers to fit within larger rollers. The nesting configuration of the rollers 114 may aid in creating a smooth outer circumference for the omni-track assembly 102 as the omni-track system 100 rotates in the longitudinal direction (+/−X-axis).

Figure 4:
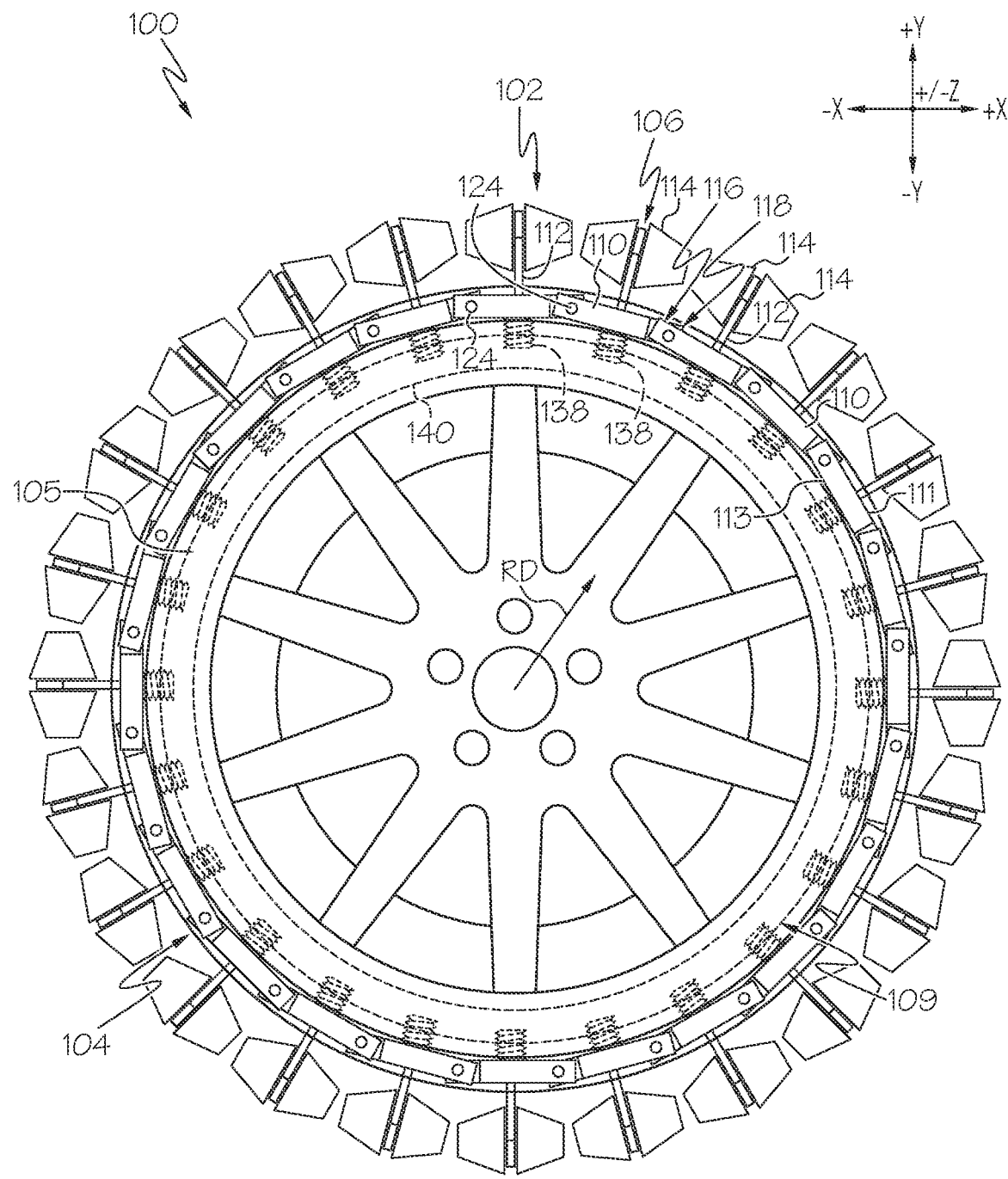
FIG. 4 schematically depicts the omni-track system of FIG. 1 as viewed along the +/−Z-axis of the depicted coordinate axes, according to one or more embodiments shown or described herein.

Referring still to FIG. 1, the track segments 110 may be arranged around the outer circumference of the tire 108. A corresponding amount of track segments 110 can be used to ensure a correct fit around the tire 108. For example, if the tire 108 has an outer circumference of thirty-six (36) inches, and each track segment 110 is two (2) inches long, then eighteen (18) track segments 110 would be linked together and arranged around the tire 108 like a tread. However, if a gap is formed in the omni-track assembly 102 due to an amount of track segments 110 not corresponding with the circumference of the tire 108, then a separate securement means and/or tensioning device may be used (as depicted in FIG. 4) to secure the omni-track assembly 102 to the wheel assembly 104. In an embodiment, the track segments 110 may be slightly curved to have better contact with the outer circumference of the tire 108. Additionally, the wheel assembly 104 may further include a channel 109 formed on the outer circumference of the wheel assembly 104. The channel 109 may be integral with the rim 105 or the tire 108. The channel 109 may be operatively arranged to prevent lateral sliding of the omni-track assembly 102 off the wheel assembly 104 as the omni-track system 100 travels in either the longitudinal or the lateral direction.

Figure 2:
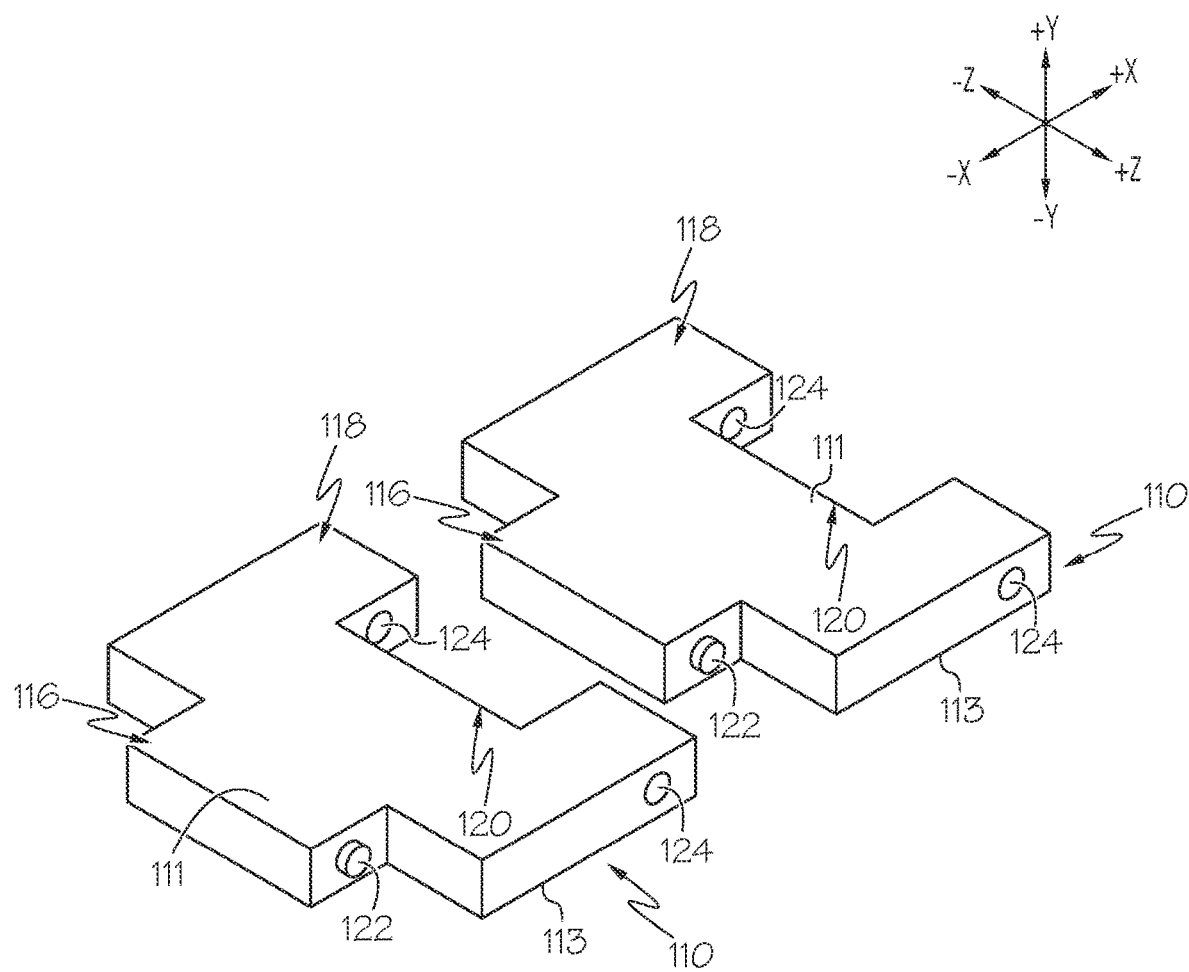
FIG. 2 schematically depicts omni-track segments of the omni-track system of FIG. 1, according to one or more embodiments shown or described herein.

Referring now to FIG. 2, two (2) track segments 110 are depicted, with the roller mount 112 and the rollers 114 removed for clarity. Each track segment 110 of the omni-track assembly 102 may include top surface 111, a bottom surface 113, a male connector 116, and a female connector 118. The roller mount 112 (depicted in FIG. 1) may be arranged on the top surface 111, while the outer circumference of the wheel assembly 104, such as the tire 108, may be in contact with the bottom surface 113. The male connector 116 may include a pin 122 arranged therein, which allows of the male connector 116 to engage with then female connector 118, forming the omni-track assembly 102. The female connector 118 may include a channel 120, which allows for the male connector 116 to be nested within the channel 120 of the female connector 118 when secured to one another to form the omni-track assembly 102 (depicted in FIG. 4). Additionally, through-bores 124 may be arranged within the female connector 118 to allow the pin 122 to pass through both the through-bores 124. In embodiments, the male connector 116 and the female connector 118 each include through-bores arranged therein, and an external pin is arranged within the through-bores, passing through a first portion of the female connector 118, then the male connector 116, and then back through a second portion of the female connector 118 arranged on the other side of the channel 120. The male connector 116 and female connector 118 of two adjacent track segments 110 may be rotatable with respect to one another along the connection formed by the pin 122 and the through-bores 124. Since the male connector 116 and the female connector 118 of two adjacent track segments 110 are rotatably connected, the omni-track assembly 102 may be used for a variety of different sized wheel assemblies 104, since the track segments 110 can be arranged in a variety of circumferences by adding or removing track segments 110 from the omni-track assembly 102.

Figure 3:
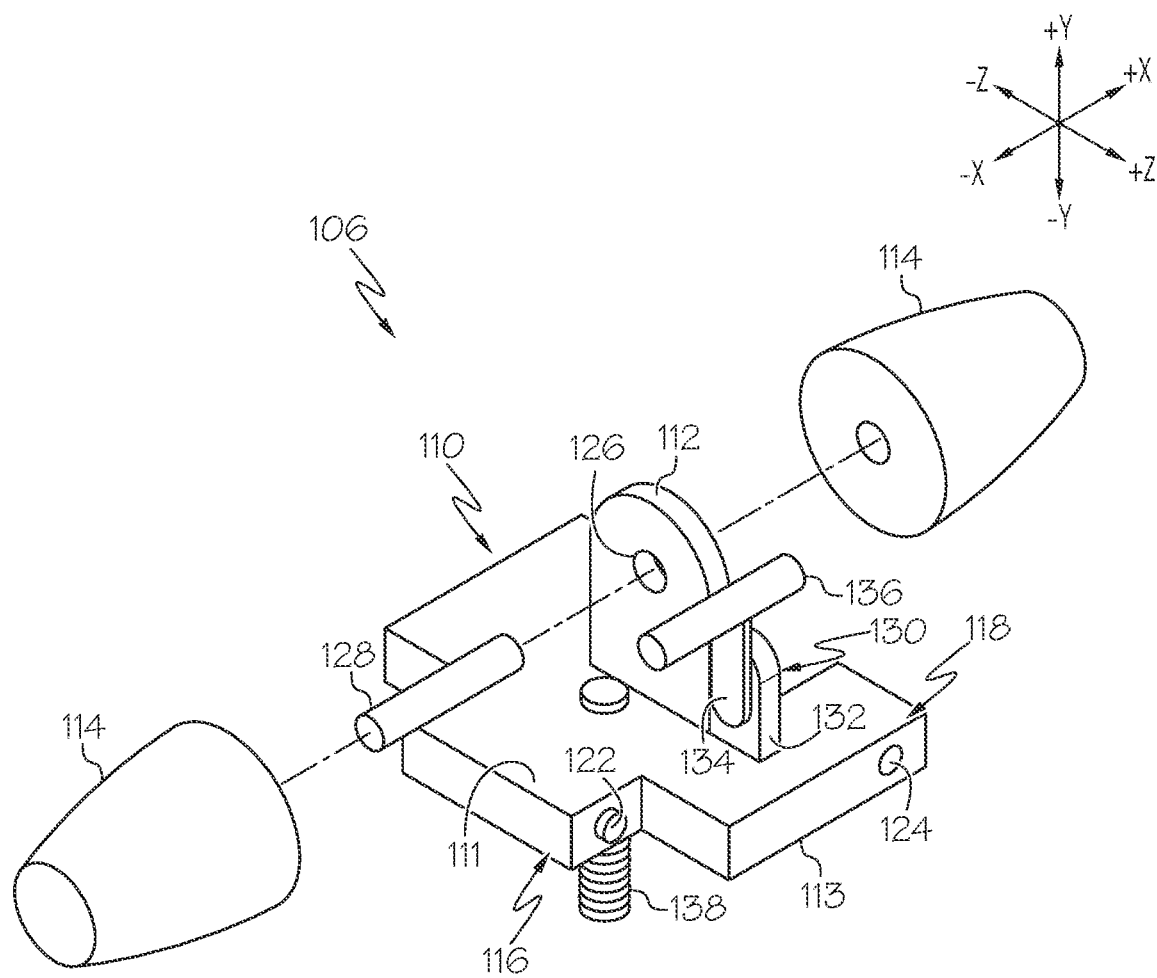
FIG. 3 schematically depicts an omni-track segment assembly of the omni-track system of FIG. 1, according to one or more embodiments shown or described herein.

Referring now to FIG. 3, a track segment assembly 106 is depicted. The track segment assembly may include the track segment 110, the roller mount 112, rollers 114, a braking assembly 130, and a set screw 138. As stated above, the roller mount 112 is secured to the track segment 110 on the top surface 111. Additionally, the roller mount 112 may include a through-bore 126 and an axle 128. The rollers 114 may be arranged on the axle 128, with the axle 128 arranged within the through-bore 126.

Referring still to FIG. 3, the braking assembly 130 may include a brake mount 132, a lever arm 134, and a braking member 136. The braking assembly 130 may be arranged to allow the braking member 136 to contact one or both of the rollers 114 in order to prevent lateral rotation of the rollers 114. The brake mount 132 may be secured to the top surface 111 of the track segment 110. The lever arm 134 may pivot along the +/−X axis with respect to the brake mount 132, with the braking member 136 being fixedly secured to the lever arm 134. The lever arm 134 may be actuated by any means known in the art, such as a mechanical lever actuated by a user. Additionally, the braking assembly 103 may be any braking device which may engage with the outer surface of the rollers 114 in order to prevent lateral rotation of the rollers 114.

In an embodiment, the braking member 136 is arranged to passively engage with the outer surface of the rollers 114 to prevent lateral rotation of the rollers 114. In the event that lateral movement of the omni-track system is desired, the braking assembly 130 may be actuated in order to disengage the braking member 136 from the outer surface of the rollers 114. When the braking member 136 is disengaged form the rollers 114, the rollers 114 are free to rotate along the +/−X axis, allowing the omni-track system to move laterally. Additionally, in an embodiment, the braking assembly 130 of each track segment assembly 106 may remain in the locked position (i.e., preventing rotation of the rollers 114) until the rollers 114 of the corresponding track segment assembly 106 contact the ground. Once the rollers 114 of a track segment assembly 106 are no longer in contact with the ground, the braking assembly 130 will reengage the braking member 136 with the outer surface of the rollers 114. It should be noted that the braking assembly 130 may also engage with the axle 128 to prevent rotation of the rollers 114 if the rollers 114 are non-rotatably secured to the axle 128.

Referring still to FIG. 3, in embodiments, the set screw 138 may be arranged on the bottom surface 113 of the track segment 110 to interact with the wheel assembly 104 designed with apertures arranged within the rim 105 or tire 108. The set screw 138 may be arranged perpendicularly on the track segment 110. In an embodiment, the set screw 138 may be arranged to secure each individual track segment assembly 106 to the wheel assembly 104. The set screw 138 may engage with apertures or a groove arranged within the wheel assembly 104. The set screw 138 may directly engage the rim 105 or the tire 108 of the wheel assembly 104. Without the track segments 110 arranged around the wheel assembly 104, the wheel assembly 104 may act as a conventional wheel. Additionally, in an embodiment where the wheel assembly 104 includes apertures arranged on the outer surface of the rim 105 or tire 108, the apertures may be covered or recessed as to not prevent the wheel assembly 104 from functioning as a conventional wheel when the track segments 110 are not arranged on the wheel assembly 104.

Referring now to FIG. 4, a tensioning device 140 may be arranged between the omni-track assembly 102 and the wheel assembly 104. The tensioning device 140 may be arranged to provide a force in the radial direction RD from the center of the wheel assembly 104. In an embodiment, the tensioning device 140 is an inflatable bladder which can be filled with a fluid. Additionally, in an embodiment, the tensioning device 140 may be a plurality of springs arranged around the wheel assembly in order to provide an outward radial force to each individual track segment 110. The tensioning device 140 may be arranged on the outer circumference of the wheel assembly 104, such as the tire 108, or may be arranged within the channel 109. In an embodiment, after the omni-track assembly 102 is arranged on the wheel assembly 104, the tensioning device 140 may be activated in order to place the omni-track assembly under a specific amount of tension which will keep the omni-track assembly 102 secured to the wheel assembly 104. Additionally, the tensioning device 140 may reduce the amount of tension on the omni-track assembly 102 in order to facilitate removal of the omni-track assembly 102 from the wheel assembly 104. In an embodiment, the tensioning device 140 may be used in combination with the set screws 138 in order to secure the omni-track assembly 102 to the wheel assembly 104.

It should now be understood that embodiments described herein are directed to an omni-track system for a wheel. The system may include a plurality of track segments. Each of the plurality of track segments may include a male connector, a female connector, a roller mount, and at least one roller. The female connector may be arranged opposite the male connector. The roller mount may be fixedly secured to the track segment. The at least one roller may be rotatably secured to the roller mount. The plurality of track segments may be linked together to fully encompass an outer circumference of the wheel, giving a traditional wheel the functionality and manoeuvrability of an omni-wheel without having to remove the wheel from a vehicle. By providing the track segments to the wheel, the wheel, converted from a conventional wheel to an omni-wheel, will be able to move in both the longitudinal and lateral directions without needing to turn the direction of the wheel. Additionally, the longitudinal and lateral movement may occur simultaneously or separately, depending on which direction of travel is required. A conventional wheel may require little to no alterations in order to secure the omni-track system to the conventional wheel, but can directly secure to the existing structure of the wheel. Additionally, the omni-track system may be removed from a conventional wheel at any time when desired to convert the conventional wheel back into its original form. A conventional wheel may also include mounting features, such as apertures, arranged on the outer surface of the rim or tire in order to secure the track segments to the outer surface of the rim or tire. A tensioning device may be arranged between the track segments and the wheel in order to apply a tension force radially outward to secure the track segments to the wheel. Additionally, a braking system may be included in order to selectively control the rotation of the rollers. The same omni-track system may be used with a variety of different sized wheels by adding or removing individual track segments which make up the omni-track system to change the diameter of the omni-track system. Since the omni-track system is made up of individual track segments, broken or damaged track segments may be removed and replaced in order to keep the omni-track system functioning properly.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An omni-track system for mounting onto a wheel, comprising:
    a plurality of track segments, wherein each of the plurality of track segments comprises:
        a male connector;
        a female connector arranged opposite the male connector;
        a roller mount fixedly secured to the track segment; and
        at least one roller rotatably secured to the roller mount, wherein the plurality of track segments are linked together to fully encompass an outer circumference of the wheel.

2. The omni-track system of claim 1, wherein roller mount extends radially outward from the wheel.

3. The omni-track system of claim 2, wherein a first roller and a second roller are secured to the roller mount and radially offset from the wheel.

4. The omni-track system of claim 1, further comprising a tensioning device arranged between the plurality of track segments and the wheel to provide a radially outward force to the plurality of track segments.

5. The omni-track system of claim 4, wherein the tensioning device is a plurality of springs arranged between of the plurality of track segments and the wheel.

6. The omni-track system of claim 4, wherein the tensioning device is an inflatable bladder arranged between of the plurality of track segments and the wheel.

7. The omni-track system of claim 4, further comprising a braking system to brake the at least one roller of each plurality of track segments.

8. The omni-track system of claim 7, wherein the braking system disengages the at least one roller while the at least one roller contacts ground, and the braking system reengages the at least one roller while the at least one roller is not in contact with the ground.

9. The omni-track system of claim 1, wherein the plurality of track segments are arranged within a channel formed on the outer circumference of the wheel.

10. The omni-track system of claim 1, wherein the plurality of track segments are linked together by a plurality of pins.

11. The omni-track system of claim 10, wherein each of the plurality of pins passes through a male connector of a first track segment and a female connector of a second track segment.

12. An omni-wheel track segment, comprising:
a male connector;
a female connector arranged opposite the male connector;
a roller mount fixedly secured to the base plate and extending radially outward from the track segment;
a first roller rotatably secured to the roller mount;
a second roller rotatably secured to the roller mount, opposite the first roller;
a braking system arranged to prevent rotation of the first roller and the second roller; and
a mounting device arranged opposite the roller mount.

13. The omni-wheel track segment of claim 12, wherein a plurality of track segments are linked together to fully encompass an outer circumference of a wheel.

14. The omni-wheel track segment of claim 13, wherein the plurality of track segments are linked together by a plurality of pins.

15. The omni-wheel track segment of claim 14, wherein each of the plurality of pins passes through a male connector of a first track segment and a female connector of a second track segment.

16. The omni-wheel track segment of claim 12, wherein the mounting device is a set screw which secures the track segment to the outer circumference of a wheel.

17. The omni-wheel track segment of claim 16, wherein a tensioning device is arranged between the track segment and the wheel to provide a radially outward force to the track segment.

18. The omni-wheel track segment of claim 17, wherein the tensioning device is a spring arranged between of the track segment and the wheel.

19. The omni-wheel track segment of claim 17, wherein the tensioning device is an inflatable bladder arranged between of the track segment and the wheel.

20. The omni-wheel track segment of claim 12, wherein the braking system disengages the first roller and the second roller when the first roller and the second roller contact the ground.

* * * * *